(12) United States Patent
Hwang et al.

(10) Patent No.: US 11,089,617 B2
(45) Date of Patent: Aug. 10, 2021

(54) HARQ PERFORMING METHOD FOR SHORTENED TTI SUPPORT IN WIRELESS COMMUNICATION SYSTEM, AND APPARATUS THEREFOR

(71) Applicant: LG Electronics Inc., Seoul (KR)

(72) Inventors: Daesung Hwang, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 16/098,738

(22) PCT Filed: May 2, 2017

(86) PCT No.: PCT/KR2017/004633
§ 371 (c)(1),
(2) Date: Nov. 2, 2018

(87) PCT Pub. No.: WO2017/191964
PCT Pub. Date: Nov. 9, 2017

(65) Prior Publication Data
US 2019/0150171 A1 May 16, 2019

Related U.S. Application Data

(60) Provisional application No. 62/341,620, filed on May 25, 2016, provisional application No. 62/331,451, filed on May 4, 2016.

(51) Int. Cl.
| | | |
|---|---|---|
| *H04W 72/12* | (2009.01) | |
| *H04L 1/00* | (2006.01) | |
| *H04L 1/18* | (2006.01) | |
| *H04L 5/00* | (2006.01) | |
| *H04L 5/14* | (2006.01) | |
| *H04W 72/04* | (2009.01) | |
| *H04W 74/08* | (2009.01) | |

(52) U.S. Cl.
CPC .......... *H04W 72/1268* (2013.01); *H04L 1/00* (2013.01); *H04L 1/18* (2013.01); *H04L 1/1819* (2013.01);
(Continued)

(58) Field of Classification Search
None
See application file for complete search history.

(56) References Cited

U.S. PATENT DOCUMENTS

| | | | | |
|---|---|---|---|---|
| 2010/0002638 A1* | 1/2010 | Park | ...................... | H04W 72/14 370/329 |
| 2012/0218935 A1* | 8/2012 | Zhang | ................ | H04B 7/15542 370/315 |

(Continued)

FOREIGN PATENT DOCUMENTS

WO  WO2016064048  4/2016

OTHER PUBLICATIONS

Huawei, HiSilicon, "Discussion on DL HARQ timing for short TTI," R1-162111, 3GPP TSG RAN WG1 Meeting #84bis, Busan, Korea Apr. 11-15, 2016, 2 pages.
(Continued)

*Primary Examiner* — James P Duffy
(74) *Attorney, Agent, or Firm* — Fish & Richardson P.C.

(57) ABSTRACT

Disclosed in the present application is a method for transmitting and receiving signals to and from a base station by a terminal in a wireless communication system. Specifically, the method comprises the steps of: receiving, from the base station, a downlink data signal through a downlink resource of a first transmission time interval (TTI) length; and transmitting, to the base station, an uplink control signal, as a response to the downlink data signal, through an uplink resource of a second TTI length different from the first TTI length, wherein the uplink resource of the second TTI length is determined on the basis of the uplink resource of the first TTI length corresponding to the downlink resource of the first TTI length.

12 Claims, 17 Drawing Sheets

(52) U.S. Cl.
CPC .......... *H04L 1/1854* (2013.01); *H04L 1/1864* (2013.01); *H04L 5/0055* (2013.01); *H04L 5/1469* (2013.01); *H04W 72/0406* (2013.01); *H04W 72/0446* (2013.01); *H04W 74/0833* (2013.01); *H04L 1/1858* (2013.01); *H04L 5/0007* (2013.01)

(56) References Cited

U.S. PATENT DOCUMENTS

2013/0142175 A1* 6/2013 Manssour ......... H04W 72/1252
370/336

2016/0100395 A1   4/2016 Xu et al.

OTHER PUBLICATIONS

LG Electronics, "Physical layer aspect of processing time for shortened TTI," R1-162511, 3GPP TSG RAN WG1 Meeting #84bis, Busan, Korea Apr. 11-15, 2016, 6 pages.
Panasonic, "Discussion on processing time reduction in physical layer," R1-162534, 3GPP TSG RAN WG1 Meeting #84bis, Busan, Korea Apr. 11-15, 2016, 3 pages.
International Search Report and Written Opinion in International Application No. PCT/KR2017/004633, dated Jul. 24. 2017, 17 pages.

* cited by examiner (a) CONTROL-PLANE PROTOCOL STACK (b) USER-PLANE PROTOCOL STACK

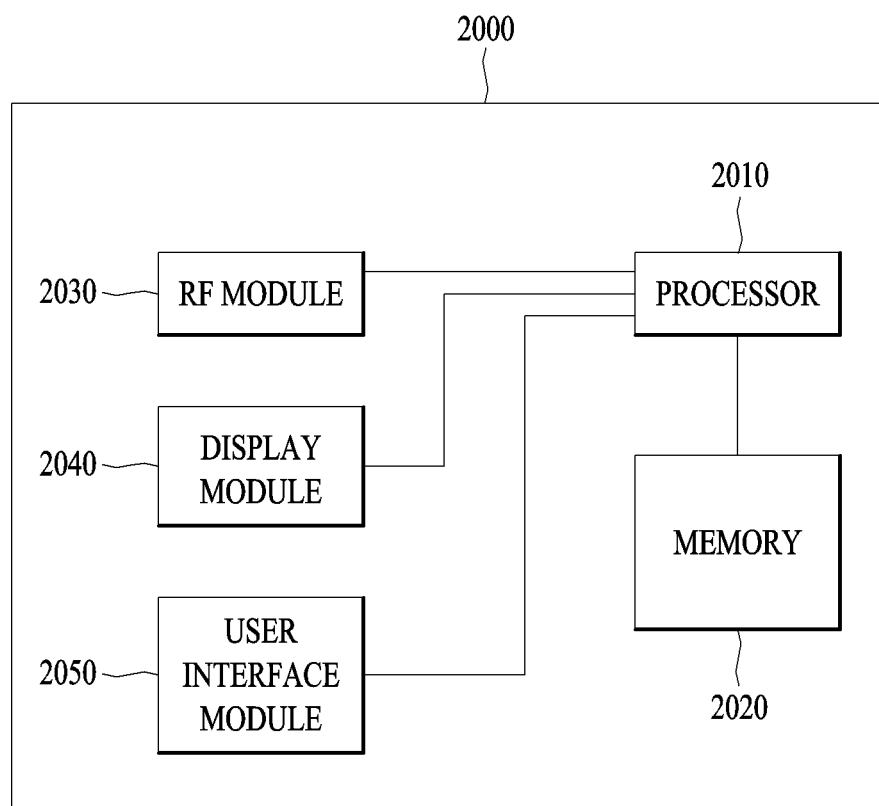

HARQ PERFORMING METHOD FOR SHORTENED TTI SUPPORT IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2017/004633, filed on May 2, 2017, which claims the benefit of U.S. Provisional Application No. 62/341,620, filed on May 25, 2016, and U.S. Provisional Application No. 62/331,451, filed on May 4, 2016. The disclosures of the prior applications are incorporated by reference in their entirety.

TECHNICAL FIELD

The present invention relates to a wireless communication system, and more particularly, to a method of performing Hybrid Automatic Repeat and reQuest (HARQ) for a shortened Transmission Time Interval (TTI) in a wireless communication system and apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the aforementioned discussion, the technical task of the present invention is to propose a method of performing HARQ for a shortened Transmission Time Interval (TTI) in a wireless communication system and apparatus therefor.

Technical Solutions

In one technical aspect of the present invention, provided herein is a method of transceiving signals with a base station by a user equipment in a wireless communication system, the method including receiving a downlink data signal through a downlink resource of a first Transmission Time Interval (TTI) length from the base station and transmitting an uplink control signal as a response to the downlink data signal to the base station through an uplink resource of a second TTI length different from the first TTI length, wherein the uplink resource of the second TTI length is determined based on an uplink resource of the first TTI length corresponding to the downlink resource of the first TTI length.

In another technical aspect of the present invention, provided herein is a user equipment in a wireless communication system, the user equipment including a wireless communication module and a processor connected to the wireless communication module, wherein the processor is configured to receive a downlink data signal through a downlink resource of a first Transmission Time Interval (TTI) length from a base station and transmit an uplink control signal as a response to the downlink data signal to the base station through an uplink resource of a second TTI length different from the first TTI length and wherein the uplink resource of the second TTI length is determined based on an uplink resource of the first TTI length corresponding to the downlink resource of the first TTI length.

Specifically, if the first TTI length is greater than the second TTI length, the uplink resource of the second TTI length may include a first uplink resource among uplink resources of the second TTI length included in the uplink resource of the first TTI length.

Moreover, if the first TTI length is smaller than the second TTI length, the uplink resource of the second TTI length may include an uplink resource, of which boundary is consistent with that of the uplink resource of the first TTI length, of the second TTI length or an uplink resource, which is defined first behind the uplink resource of the first TTI length, of the second TTI length.

Preferably, the uplink resource of the first TTI length may include a first uplink resource located after a lapse of a decoding time of the downlink data signal from the downlink resource of the first TTI length.

More preferably, if the first TTI length is 7 symbols, the second TTI length may be 2 symbols. If the first TTI length is 2 symbols, the second TTI length may be 7 symbols.

Advantageous Effects

According to an embodiment of the present invention, a user equipment and a base station can perform an HARQ scheme efficiently in response to a shortened TTI in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 20 is a block diagram of a communication apparatus according to one embodiment of the present invention.

BEST MODE FOR INVENTION

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
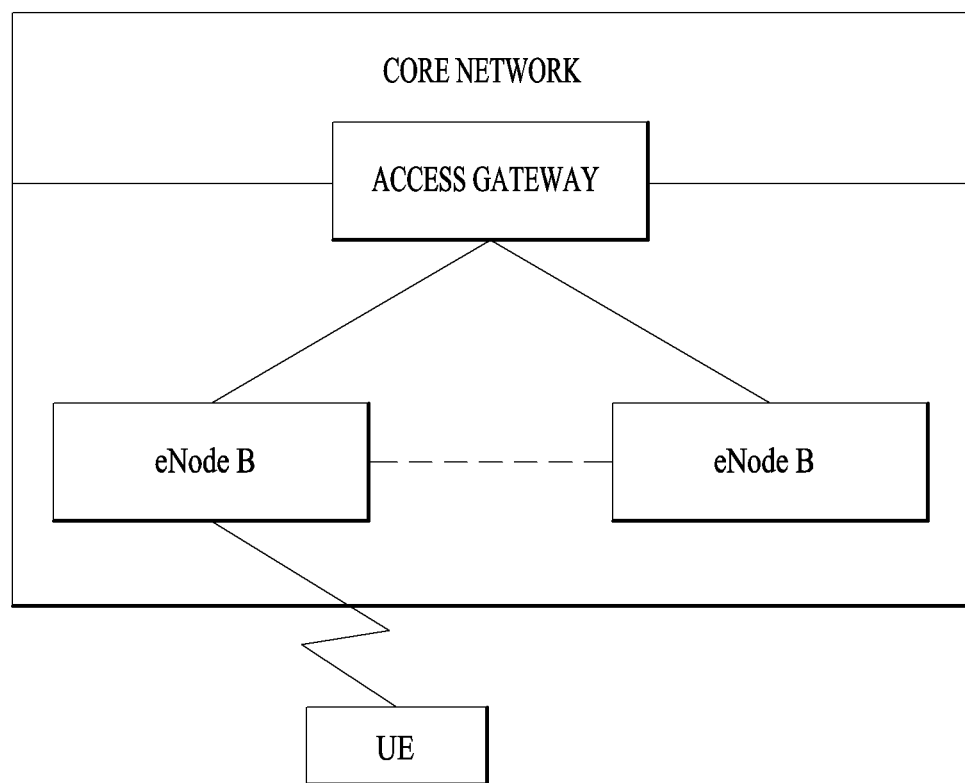
FIG. 1 illustrates a configuration of an Evolved Universal Mobile Telecommunications System (E-UMTS) network as an example of a wireless communication system.
Figure 2:
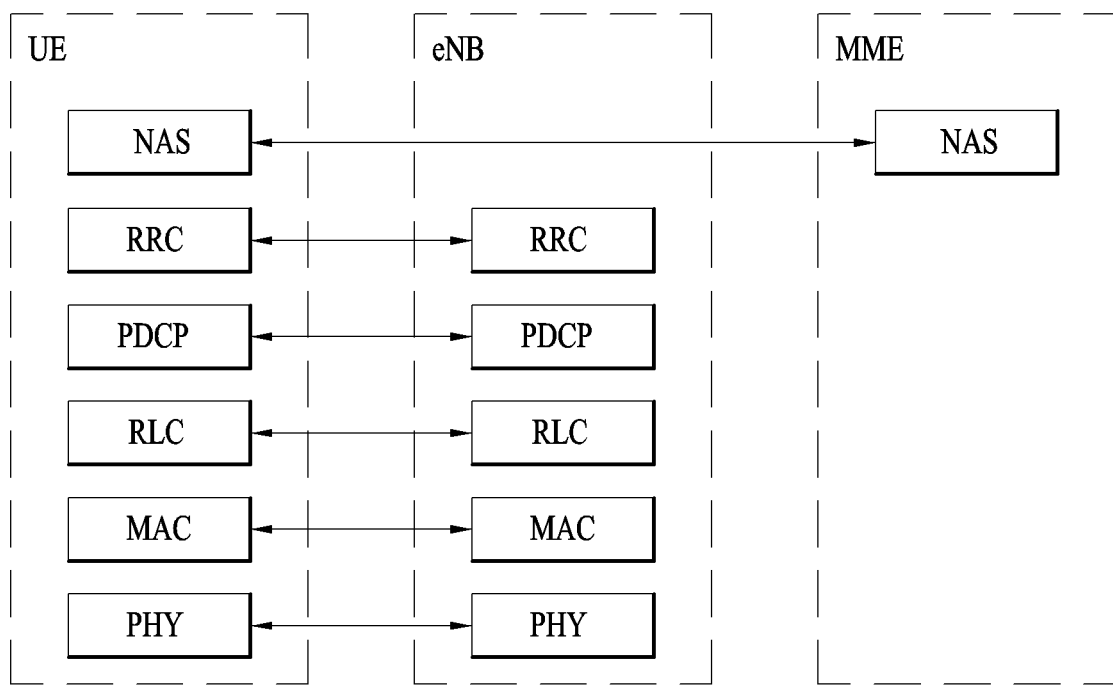
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).
Figure 2:
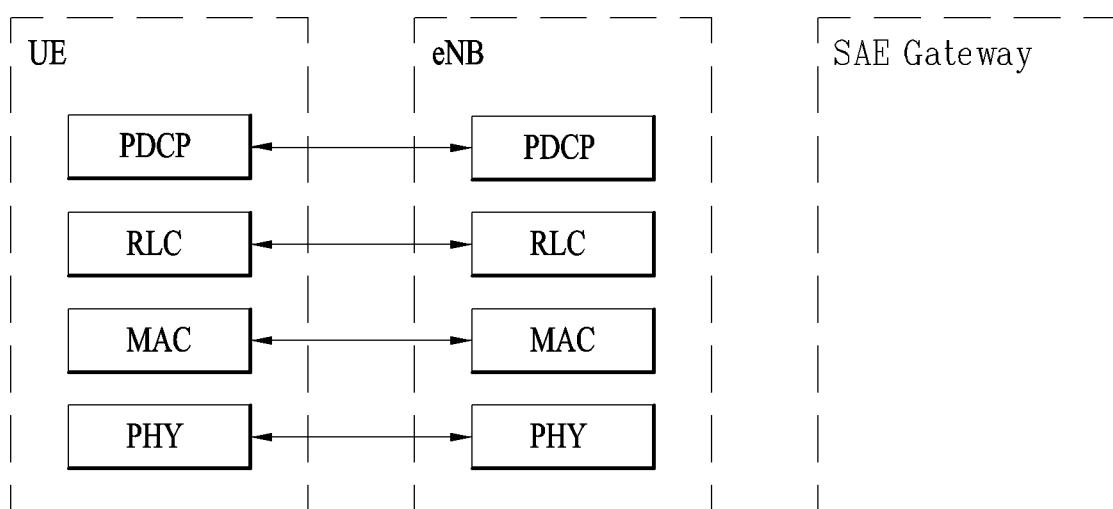

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.4, 3, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
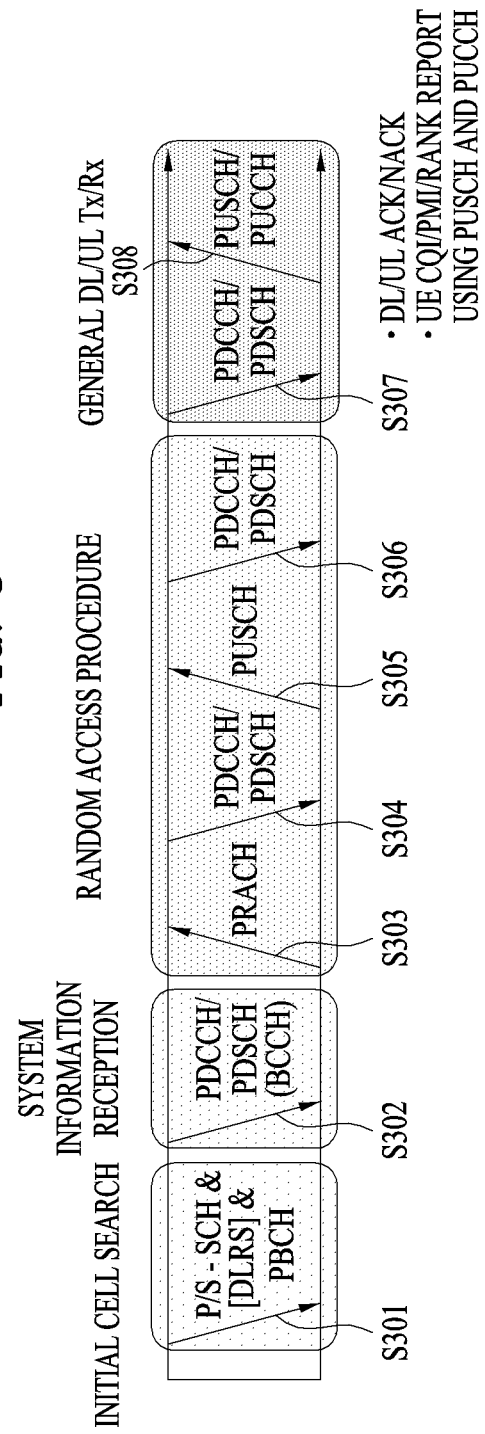
FIG. 3 illustrates physical channels and a general signal transmission method using the physical channels in a 3GPP system.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
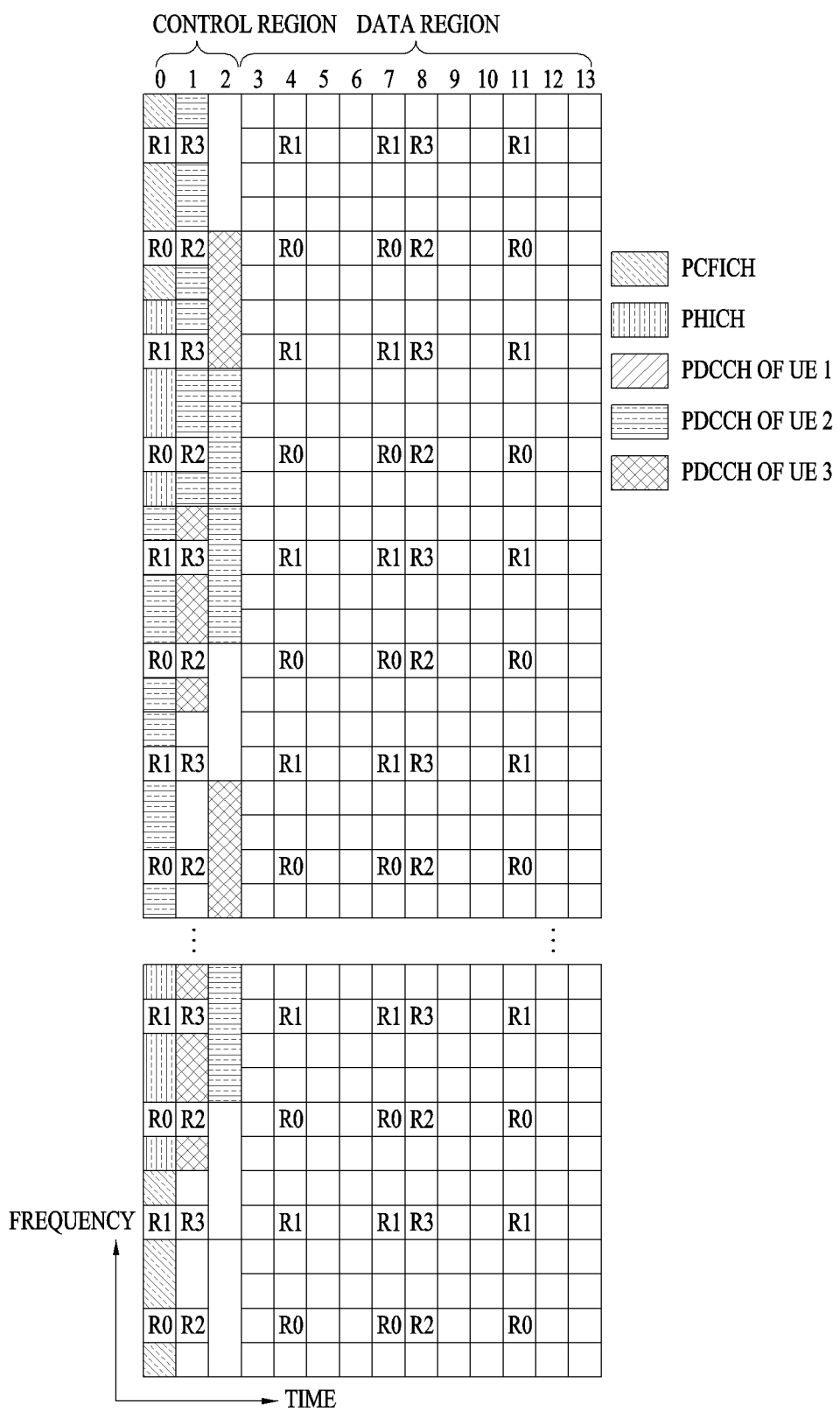
FIG. 4 illustrates a structure of a downlink radio frame in a Long Term Evolution (LTE) system.

FIG. 4 is a diagram showing a control channel included in a control region of one subframe in a downlink radio frame.

Referring to FIG. 4, a subframe includes 14 OFDM symbols. The first to third OFDM symbols are used as a control region and the remaining 13 to 11 OFDM symbols are used as a data region, according to subframe configuration. In FIG. 4, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using a radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 5:
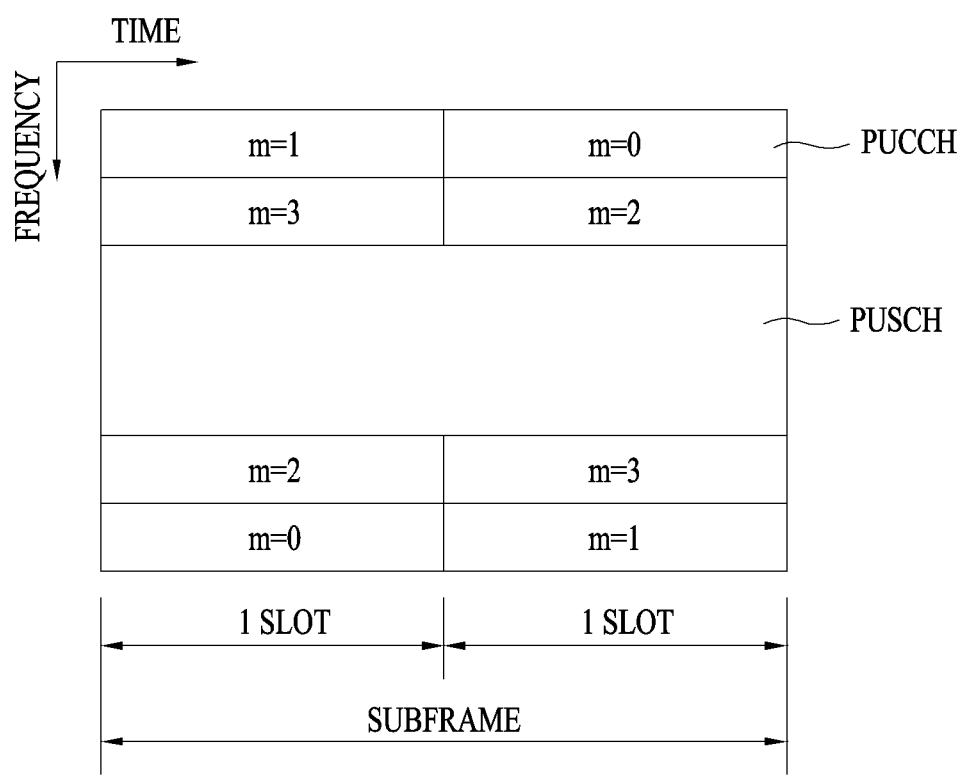
FIG. 5 illustrates a structure of an uplink subframe in the LTE system.

FIG. 5 is a diagram showing the structure of an uplink subframe used in an LTE system.

Figure 6:
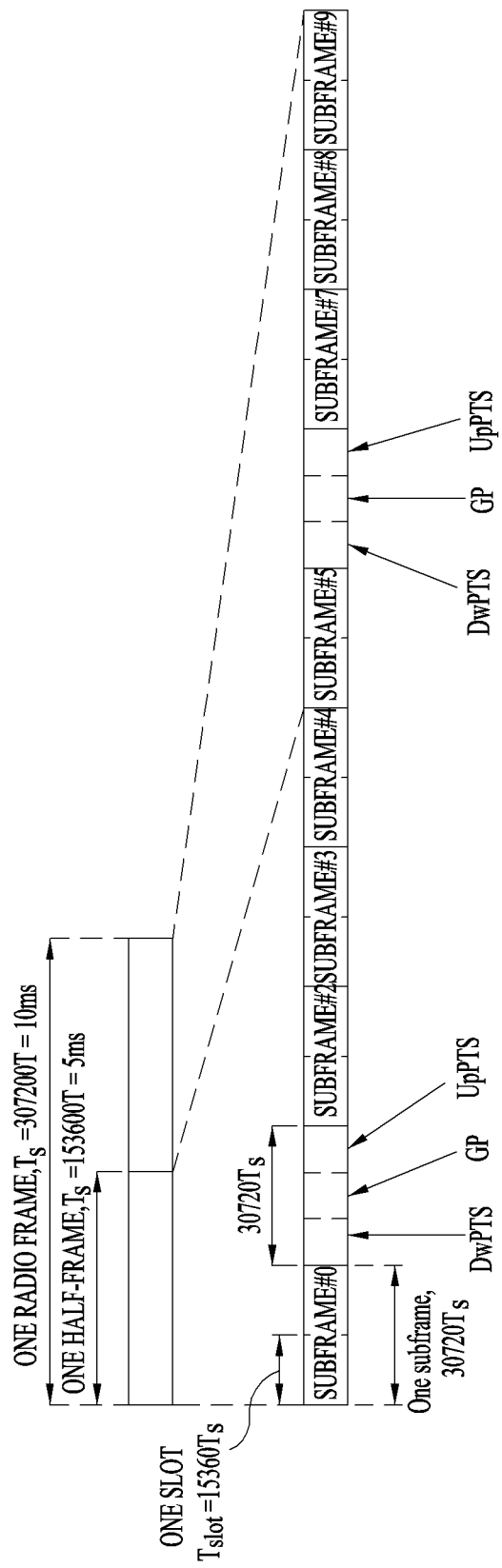
FIG. 6 is a diagram showing the structure of a radio frame used in an LTE TDD system.

Referring to FIG. 5, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or subcarriers) within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

FIG. 6 is a diagram showing the structure of a radio frame in an LTE TDD system. In an LTE TDD system, the radio frame includes two half frames, each of which includes four normal subframes including two slots and a special subframe including a downlink pilot time slot (DwPTS), a guard period (GP), and an uplink pilot time slot (UpPTS).

In the special subframe, the DwPTS is used for initial cell search, synchronization and channel estimation at a user equipment. The UpPTS is used for channel estimation of a base station and uplink transmission synchronization of the user equipment. That is, the DwPTS is used for downlink transmission and the UpPTS is used for uplink transmission. In particular, the UpPTS is used for PRACH preamble or SRS transmission. The guard period is used to remove interference occurring in uplink due to multi-path delay of a downlink signal between uplink and downlink.

The special subframe is currently defined as shown in Table 1 below in the 3GPP standard. Table 1 shows the DwPTS and the UpPTS in case of $T_s=1/(15000\times2048)$. The remaining region is configured as a guard period.

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In the LTE TDD system, an uplink/downlink (UL/DL) configuration is shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2 above, D denotes a downlink subframe, U denotes an uplink subframe and S denotes the special subframe. Table 2 above shows a downlink-to-uplink switch-point periodicity in the UL/DL configuration in each system.

In some implementations, Table 3 in the following shows an Uplink (UL) subframe number (index) for a UE to transmit ACK/NACK in response to a corresponding Downlink (DL) signal in the 3GPP LTE system based TDD system.

TABLE 3

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 |

Particularly, in Table 3, '-' indicates that it is configured as a UL subframe and a numeral assigned to each subframe number indicates a UL subframe index. Namely, the numeral indicates a UL subframe index linked to a corresponding DL subframe.

In a next generation wireless communication system, for the purpose of meeting requirements of various applications, a method of changing (particularly, reducing) a TTI for a physical channel entirely or in part is under discussion. As a method of reducing total latency in providing a service, it may be able to consider a scheme of reinforcing a procedure for a UL access as well as reducing the TTI for the physical channel. The UL access may be configured in a manner of changing data into an available state at a UE end, making a request for a UL grant to an eNB, sending the UL grant from the eNB, and transmitting PUSCH from the UE having received the UL grant.

In case of applying latency reduction in a TDD system, HARQ-ACK timing may be restrictive according to a preset DL subframe and a preset UL subframe. The present invention proposes HARQ timing/PUSCH transmission (Tx) timing in case of introducing a shortened TTI into TDD UL/DL configuration of LTE Release-13 Standard. And, the present invention proposes HARQ timing/PUSCH Tx timing in case of introducing an additional subframe type for latency reduction. Although an embodiment of the present invention assumes a case that a length of a shortened TTI is configured with 2 symbols or 7 symbols for clarity of description, it is obvious that the extension from the present invention is applicable to other shortened TTI configurations.

After initial PDCCH/PDSCH transmission, a UE may receive it and then perform a detecting and decoding process such as a blind decoding and the like. Thereafter, the UE may perform an encoding process for PUCCH or PUSCH transmission to transmit HARQ-ACK for PDSCH and then perform a transmission by advancing a transmission timing for Timing Adjustment (TA). The above processes (hereinafter, processing time) are performs for 3 msec with reference to a normal TTI configured with 14 symbols in an FDD system. And, HARQ-ACK for PDSCH transmitted in a subframe #n may be transmitted on PUCCH or PUSCH in a subframe #n+4.

As a shorted TTI of a similar type is introduced, the processing time may be changed scalably depending on a TTI length. For example, it may be performed for 3 TTIs. In this case, HARQ-ACK for (s)PDSCH transmitted in sTTI #n may be transmitted on sPUCCH in sTTI #n+4 (in case of 7 symbol-TTI, 2 msec later).

Yet, in case of a TDD system, a position of a DL subframe, a position of a UL subframe, and a position of a special subframe configured with DwPTS, UpPTS and GP can be predefined according to TDD UL/DL configuration. According to a normal TTI reference, a timing for transmitting a corresponding PUCCH after transmitting PDSCH or a timing for transmitting a corresponding PUSCH after transmitting PDCCH for a UL grant may be set to a value greater than 4 msec according to TDD UL/DL configuration instead of the reference of 4 msec.

Likewise, if a timing for performing DL or UL transmission actually is restrictive despite introducing a shortened TTI, the above-mentioned timings may be restrictive in being changed in sTTI unit (e.g., 4 sTTI). To mitigate this, the next generation wireless communication system is considering introducing an additional subframe type (configured with DL symbol, UL symbol and GP), for which HARQ timing needs to be newly defined.

First Embodiment—Latency Reduction Using TDD UL/DL Configuration

Basically, a DL sTTI, which is a basic time unit for scheduling sPDCCH/sPDSCH, may be configured with DL sTTI within a special subframe, DL sTTI overlapping with a legacy PDCCH region entirely or in part, and the rest of general sTTI. Moreover, a UL sTTI, which is a basic time unit for scheduling sPUSCH/sPUCCH, may be configured with UL sTTI within a special subframe, UL sTTI including SRS symbol (last symbol in each subframe of normal TTI), and the rest of general UL sTTI.

Basically, HARQ-ACK timing means a reference for transmitting HARQ-ACK at a possibly early timing after the relevant PDSCH transmission. Additionally, it is necessary to consider preventing occurrence of inversion from connecting a plurality of DL sTTIs and UL sTTIs together [e.g., as to UL#1 and UL#2 disposed in time order in a situation that DL#1 and DL#2 are disposed in time order, DL#1 and UL#2 correspond to each other but DL#2 and UL#1 do not correspond to each other, hereinafter inversion prevention] and consider preventing HARQ-ACK bits from being concentrated on a single UL sTTI [HARQ-ACK distribution], etc.

According to a TTI length and a PDCCH region corresponding to the symbol number determined as PCFICH or by a higher layer, sPDSCH transmission in a corresponding sTTI may be impossible and inefficient. For example, in case of a 2-symbol TTI, if a PDCCH region is also configured with 2 symbols, since sPDSCH will not be substantially mapped to a corresponding sTTI, setting an HARQ-ACK timing may be meaningless. On the other hand, when a timing between UL grant and PUSCH is set up, since a PDCCH region is still usable, a corresponding timing may be set separately from an HARQ-ACK timing.

Typically, an HARQ-ACK timing for DL sTTI including a PDCCH region entirely or in part may be configured as a same bundling window in form of corresponding to the same UL sTTI as HARQ-ACK for another adjacent DL sTTI. Since sPDSCH scheduling in a corresponding DL sTTI may not occur depending on a PDCCH region, if the corresponding DL sTTI and another DL sTTI are connected to each other through the same bundling window, it may be able to reduce a substantial timing and minimize sPUCCH coverage reduction. As a detailed example of the present invention, described in the following is an HARQ-ACK timing for a case that a TTI length in TDD UL/DL configuration #1 is 7 and a case that a TTI length in TDD UL/DL configuration #1 is 2.

First Method

A timing is set so that HARQ-ACK bits for sPDSCH transmitted in each DL sTTI are evenly distributed to a UL sTTI in consideration of sPUCCH coverage. In this case, a DL sTTI possible to overlap with a PDCCH region preferably corresponds to a separate UL sTTI.

Basically, a DL sTTI corresponding to a first UL sTTI in a frame may include an earliest DL sTTI within 10 ms ahead of x TTI (e.g., 4 TTI) (a case that a UL subframe exists in a single half frame only) or within 5 ms (a case that a UL subframe exists in each half frame). A DL sTTI corresponding to a next UL sTTI may include a DL sTTI next to the DL sTTI corresponding to the first UL sTTI. If the number of DL sTTIs is greater than that of UL sTTIs, some UL sTTIs may need to include a plurality of DL sTTIs. In this case, the above scheme may be extended to achieve a high-speed HARQ-ACK timing.

Typically, in mapping DL sTTIs amounting to a difference between the number of DL sTTIs and the number of UL sTTIs to UL sTTI by overlapping with other DL sTTI, the DL sTTI of the overlapping target, which overlaps with a PDCCH region, may be selected preferentially. For example, a DL sTTI first corresponding to a UL sTTI in a frame may include a plurality of DL sTTIs earliest within 10 or 5 ms ahead of X TTI (e.g., 4 TTI). As a plurality of the DL sTTIs, sTTIs overlapping with a PDCCH region may be selected preferentially. Nonetheless, if there are more DL sTTIs, a bundling window may be configured between sTTIs not overlapping with the PDCCH region.

For detailed example, if the number of DL sTTIs is N_DL and the number of UL sTTIs is N_UL, the number of DL sTTIs corresponding to a first UL sTTI in a frame is N_DL−floor(N_DL/N_UL)*(N_UL−1) and the number of DL sTTIs corresponding to the rest of UL sTTIs may be floor(N_DL/N_UL).

According to another scheme, if the number of sTTIs having N_DL overlap with a PDCCH region again is N_DL1 and the number of the rest of DL sTTIs is N_DL2, a bundling size for UL sTTI not corresponding to DL sTTI overlapping with the PDCCH region among UL sTTIs except the first UL sTTI is floor(N_DL2/N_UL). And, a bundling window size for UL sTTI corresponding to DL sTTI overlapping with the PDCCH region among UL sTTIs except the first UL sTTI is floor(N_DL2/N_UL)+1 [if N_DL1 is smaller than N_UL. Otherwise, it may be a value equal to or greater than N_UL.] Finally, if a first UL sTTI corresponds to DL sTTI overlapping with the PDCCH region, a bundling window size may be N_DL2−floor (N_DL2/N_UL)*(N_UL−1)+1. If not, a bundling window size may be N_DL2−floor(N_DL2/N_UL)*(N_UL−1).

Figure 7:
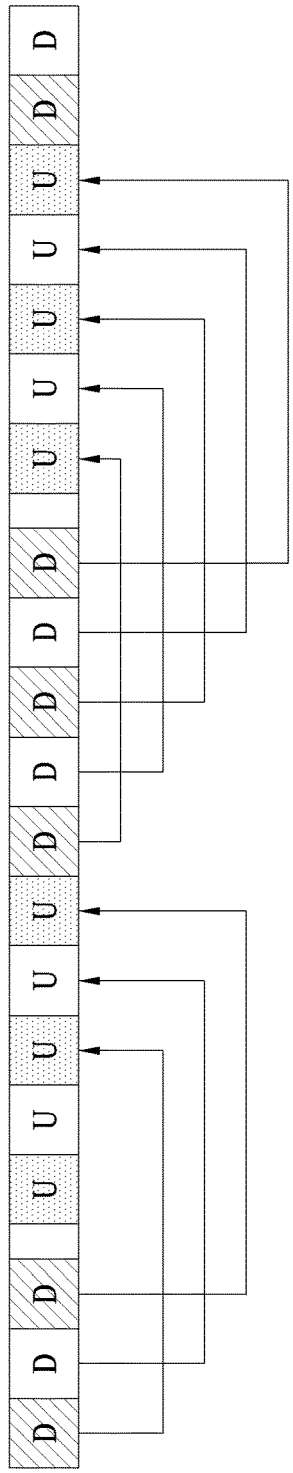
FIG. 7 shows one example of an HARQ-ACK timing for a case that a length of TTI is 7 symbols in TDD UL/DL configuration #1 according to a first method of a first embodiment of the present invention.

FIG. 7 shows one example of an HARQ-ACK timing for a case that a length of TTI is 7 symbols in TDD UL/DL configuration #1 according to a first method of a first embodiment of the present invention.

Figure 8:
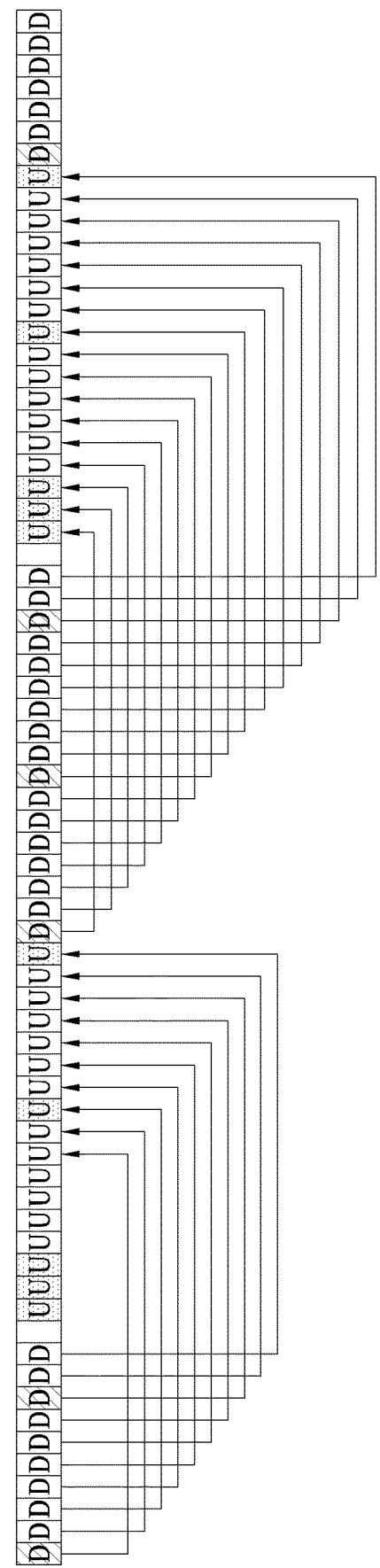
FIG. 8 shows one example of an HARQ-ACK timing for a case that a length of TTI is 2 symbols in TDD UL/DL configuration #1 according to a first method of a first embodiment of the present invention.

FIG. 8 shows one example of an HARQ-ACK timing for a case that a length of TTI is 2 symbols in TDD UL/DL configuration #1 according to a first method of a first embodiment of the present invention.

Second Method

The number of UL symbols configuring a special subframe may differ according to special subframe configuration, and PRACH or SRS may be possibly transmitted in the corresponding region. In order to define a timing irrespective of the special subframe configuration, it is necessary to put restriction on utilizing UL symbols in a special subframe at least entirely or in part. In this case, some UL sTTI may correspond to a plurality of DL sTTIs, and the DL sTTI should correspond to or overlap with a PDCCH region. For a detailed timing setting, the first method may be used and a UL sTTI included in a special subframe among target UL sTTIs may be excluded from mapping targets.

Figure 9:
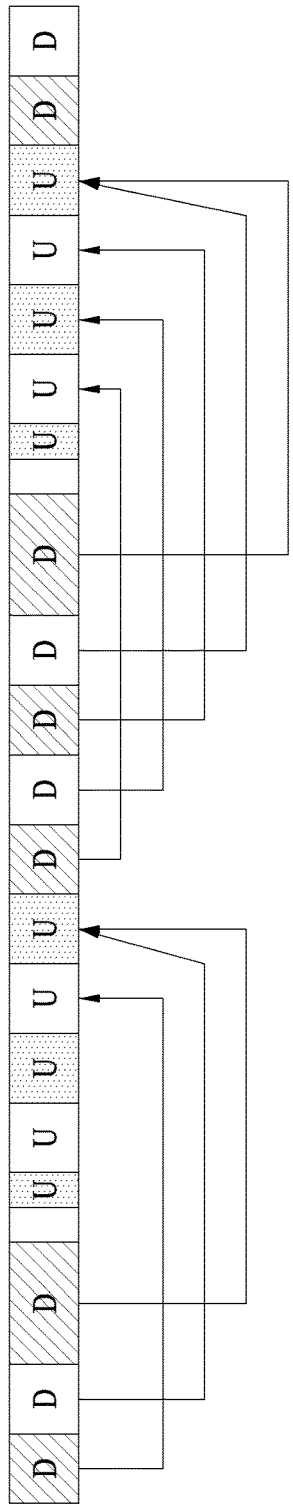
FIG. 9 shows one example of an HARQ-ACK timing for a case that a length of TTI is 7 symbols in TDD UL/DL configuration #1 according to a second method of a first embodiment of the present invention.

FIG. 9 shows one example of an HARQ-ACK timing for a case that a length of TTI is 7 symbols in TDD UL/DL configuration #1 according to a second method of a first embodiment of the present invention.

Figure 10:
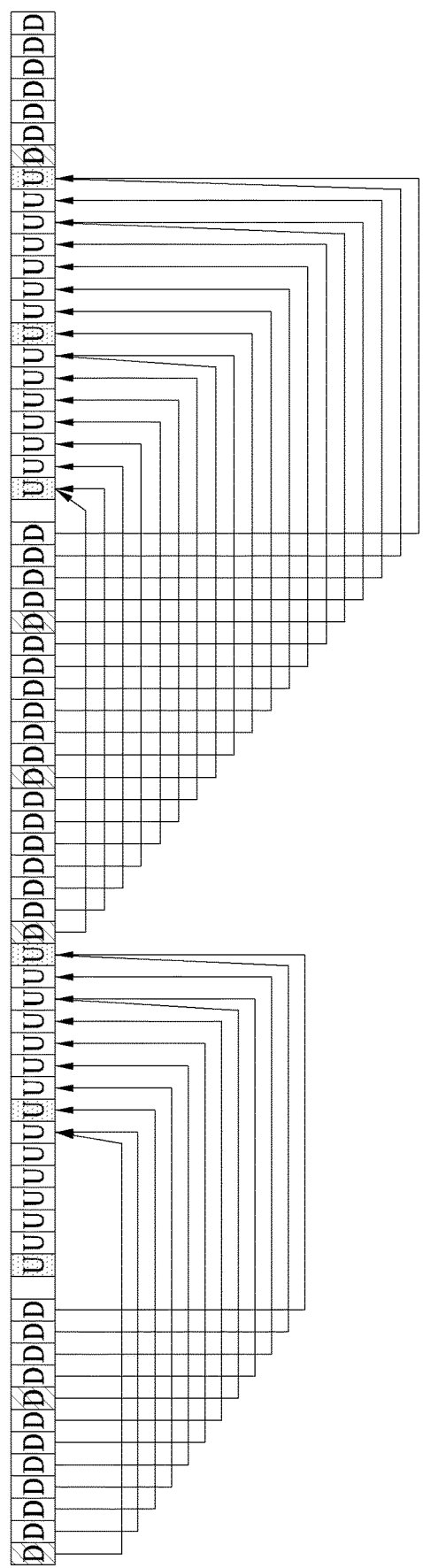
FIG. 10 shows one example of an HARQ-ACK timing for a case that a length of TTI is 2 symbols in TDD UL/DL configuration #1 according to a second method of a first embodiment of the present invention.

FIG. 10 shows one example of an HARQ-ACK timing for a case that a length of TTI is 2 symbols in TDD UL/DL configuration #1 according to a second method of a first embodiment of the present invention.

Third Method

A plurality of DL sTTIs are made to correspond to all or some UL sTTIs. The DL sTTI overlapping with a PDCCH region may be prioritized. For example, in case that a length of TTI is 2 symbols, when a plurality of DL sTTIs are made to correspond to a single UL sTTI for a high-speed HARQ-ACK timing, each bundling window size may be set equal to or greater than a bundling window size containing DL sTTI overlapping with a PDCCH region.

A detailed timing setting scheme may follow a scheme that is extended from the first method and exclude some target UL sTTIs in part (e.g., excluding a single late-timing sTTI or a plurality of late-timing sTTIs among the UL sTTIs).

Figure 11:
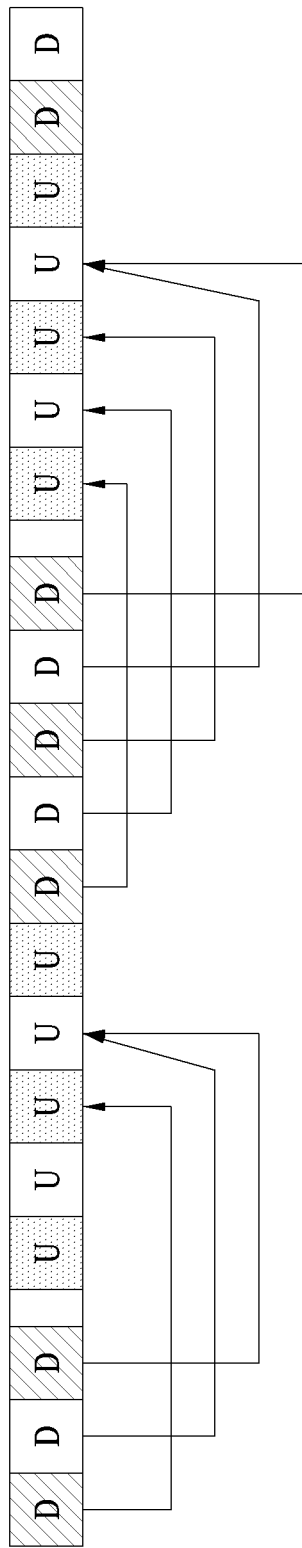
FIG. 11 shows one example of an HARQ-ACK timing for a case that a length of TTI is 7 symbols in TDD UL/DL configuration #1 according to a third method of a first embodiment of the present invention.

FIG. 11 shows one example of an HARQ-ACK timing for a case that a length of TTI is 7 symbols in TDD UL/DL configuration #1 according to a third method of a first embodiment of the present invention.

Figure 12:
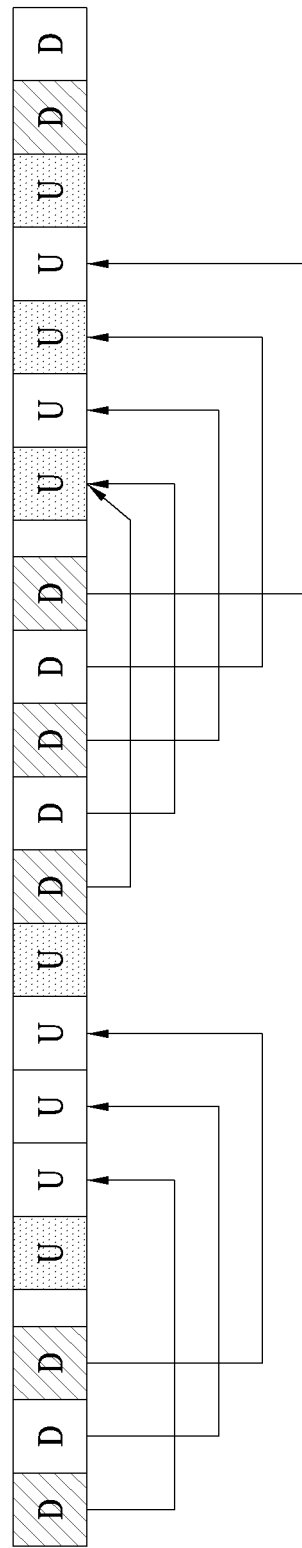
FIG. 12 shows another example of an HARQ-ACK timing for a case that a length of TTI is 7 symbols in TDD UL/DL configuration #1 according to a third method of a first embodiment of the present invention.

FIG. 12 shows another example of an HARQ-ACK timing for a case that a length of TTI is 7 symbols in TDD UL/DL configuration #1 according to a third method of a first embodiment of the present invention.

Figure 13:
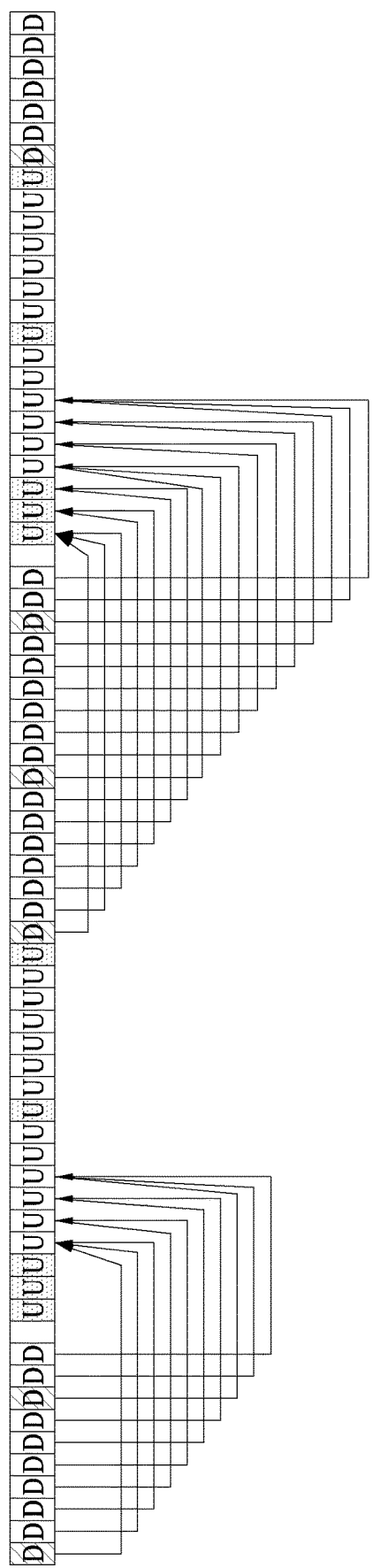
FIG. 13 shows one example of an HARQ-ACK timing for a case that a length of TTI is 2 symbols in TDD UL/DL configuration #1 according to a third method of a first embodiment of the present invention.

FIG. 13 shows one example of an HARQ-ACK timing for a case that a length of TTI is 2 symbols in TDD UL/DL configuration #1 according to a third method of a first embodiment of the present invention.

Figure 14:
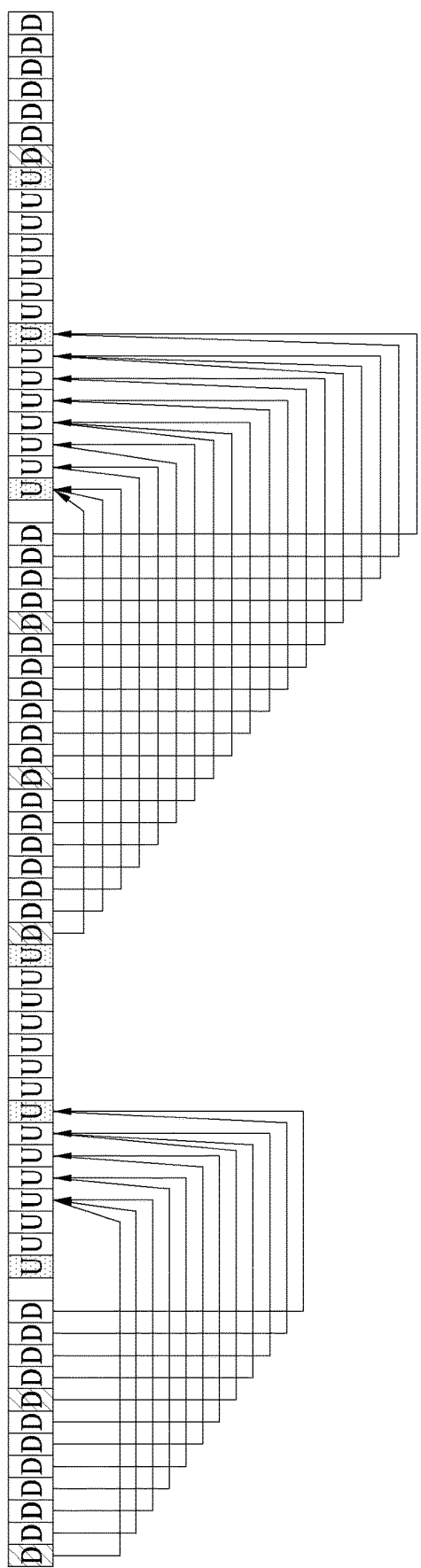
FIG. 14 shows another example of an HARQ-ACK timing for a case that a length of TTI is 2 symbols in TDD UL/DL configuration #1 according to a third method of a first embodiment of the present invention.

FIG. 14 shows another example of an HARQ-ACK timing for a case that a length of TTI is 2 symbols in TDD UL/DL configuration #1 according to a third method of a first embodiment of the present invention.

The above-described HARQ-ACK timing may be used again for a corresponding sPUSCH Tx timing setting after sPDCCH transmission for a UL grant. Typically, a PUSCH Tx timing according to a UL grant may be set different from a DL HARQ-ACK timing (i.e., an sPUCCH Tx timing after sPDSCH transmission).

For example, an HARQ-ACK timing may independently indicate an actual HARQ-ACK Tx timing for each of the aforementioned timings in case of a dynamic change in the same manner as the third method, whereas an sPUSCH Tx timing according to a UL grant is evenly distributed for UL sTTI in the same manner of the second method.

Second Embodiment—Latency Reduction Using TDD UL/DL Configuration Modification

In the next generation wireless communication system, it is able to consider introducing an additional subframe type into a TDD system for latency reduction. In case of using the additional subframe type, a spacing between a DL sTTI and a UL sTTI is reduced so as to facilitate the substantial improvement of latency.

The additional subframe type may be configured with a DL symbol, a GP and a UL symbol. According to a configuration scheme, a GP is generally disposed after a plurality of DL symbols and then UL symbols are disposed. Alternatively, in order to reduce a time gap for the switching to DL from UL, a UL symbol is disposed first and then a DL symbol is disposed. Alternatively, the additional subframe type may be configured with DL or UL symbols only. If necessary (a case that a UL subframe is located behind an additional subframe type configured with DL symbols only, a case that a DL subframe is located ahead of an additional subframe type configured with UL symbols only), a GP may be mapped to a front or rear end of a subframe. Moreover, a configuration scheme of an additional subframe type may differ in each applied subframe.

According to an embodiment of the present invention, for clarity of description, a disposition of an additional subframe type is assumed as including a DL symbol, a GP and a UL symbol.

In the next generation wireless communication system, a subframe to which an additional subframe type is applied can be limited to some subframes, and a subframe #0 and a subframe #5 to the minimum may operate as DL subframes only in consideration of at least SS/PBCH and the like. Moreover, a subframe #2 may operate as a UL subframe only in the same manner as always operating as a UL subframe in all TDD UL/DL configurations and may not be used as an additional subframe type. An additional subframe type may be applicable to the rest of subframes, applicable to UL subframes entirely or in part step by step, or applicable to the rest of subframes entirely or in part except the subframes #0, #2 and #5. A method of setting an HARQ-ACK timing according to an additional subframe type addition is described in detail as follows.

Method A)

First of all, an HARQ-ACK timing before the introduction of an additional subframe type is maintained as far as possible. In case that a connection from DL to UL is maintained, a timing is maintained intact. If the DL-to-UL connection is changed into a DL-to-DL connection, it is able to consider delaying a timing to a next UL sTTI. For example, if sTTI #n is changed into DL from UL owing to an additional subframe type introduction, DL sTTI used to correspond to the sTTI #n may correspond to the earliest UL sTTI after the sTTI #n again.

In case of sTTI changed into DL from UL owing to an additional subframe type introduction, UL sTTI corresponding to the DL may correspond to the earliest UL sTTI after 4 TTIs. In this case, when HARQ-ACK bits are configured after bundling window configuration, a DL sTTI for a corresponding additional subframe type may correspond to LSB. Typically, in case that a DL sTTI overlapping with a PDCCH region exists in a bundling window, HARQ-ACK corresponding to a DL sTTI corresponding to the PDCCH region may be disposed behind HARQ-ACK corresponding to a DL sTTI for an additional subframe type.

Figure 15:
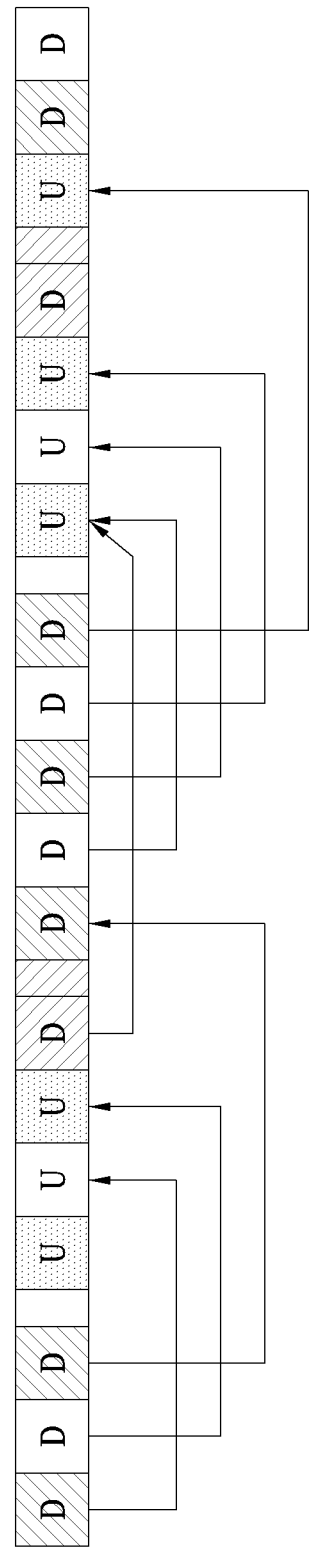
FIG. 15 shows one example of an HARQ-ACK timing for a case that a length of TTI is 7 symbols in case of introducing an additional subframe type into some uplink subframes in TDD UL/DL configuration #1 according to a method A) of a second embodiment of the present invention.

FIG. 15 shows one example of an HARQ-ACK timing for a case that a length of TTI is 7 symbols in case of introducing an additional subframe type into some uplink subframes in TDD UL/DL configuration #1 according to a method A) of a second embodiment of the present invention. Particularly, in FIG. 15, an additional subframe type is assumed as applied to a subframe #3, a subframe #8 and the like.

Figure 16:
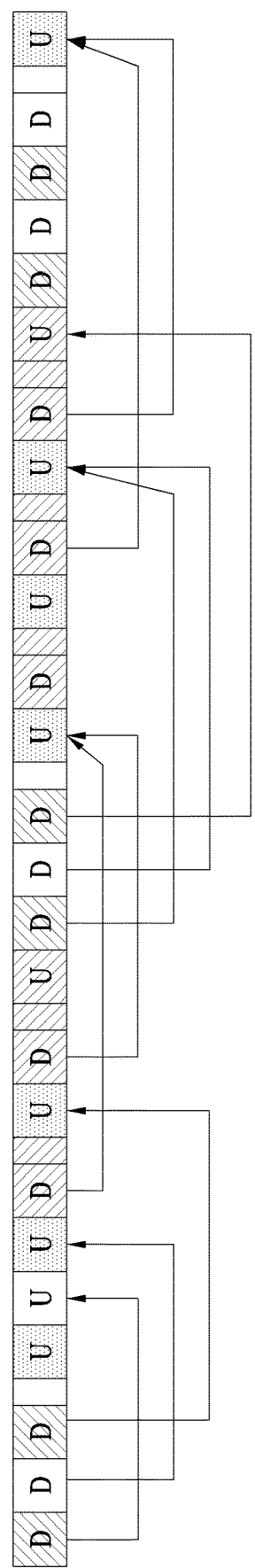
FIG. 16 shows another example of an HARQ-ACK timing for a case that a length of TTI is 7 symbols in case of introducing an additional subframe type into some uplink subframes in TDD UL/DL configuration #1 according to a method A) of a second embodiment of the present invention.

FIG. 16 shows another example of an HARQ-ACK timing for a case that a length of TTI is 7 symbols in case of introducing an additional subframe type into some uplink subframes in TDD UL/DL configuration #1 according to a method A) of a second embodiment of the present invention. Particularly, in FIG. 16, an additional subframe type is assumed as applied to a subframe #0, a subframe #2, a subframe #5 and the like.

Figure 17:
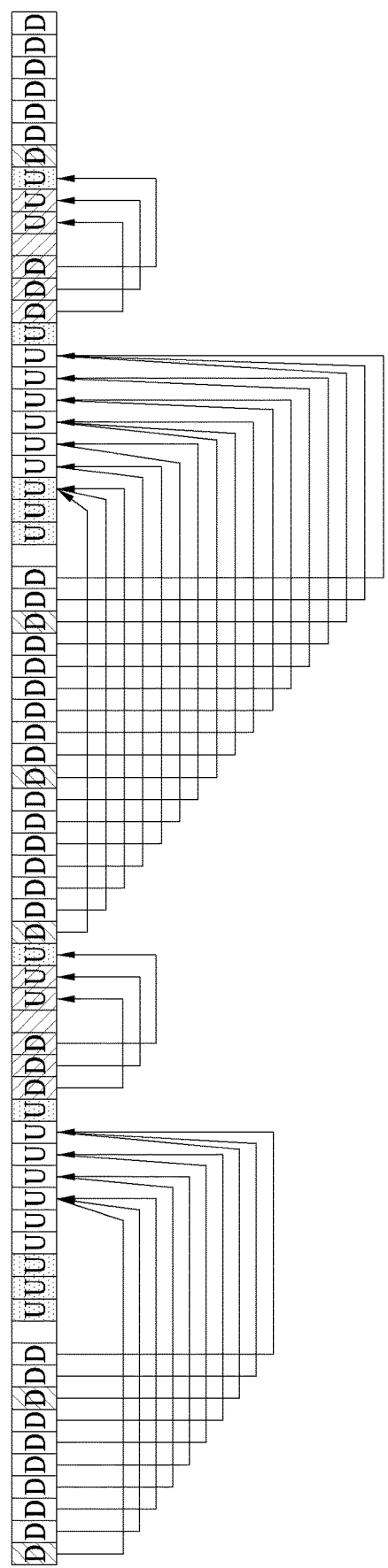
FIG. 17 shows one example of an HARQ-ACK timing for a case that a length of TTI is 2 symbols in case of introducing an additional subframe type into some uplink subframes in TDD UL/DL configuration #1 according to a method A) of a second embodiment of the present invention.

FIG. 17 shows one example of an HARQ-ACK timing for a case that a length of TTI is 2 symbols in case of introducing an additional subframe type into some uplink subframes in TDD UL/DL configuration #1 according to a method A) of a second embodiment of the present invention. Particularly, in FIG. 17, an additional subframe type is assumed as applied to a subframe #3, a subframe #8 and the like.

Figure 18:
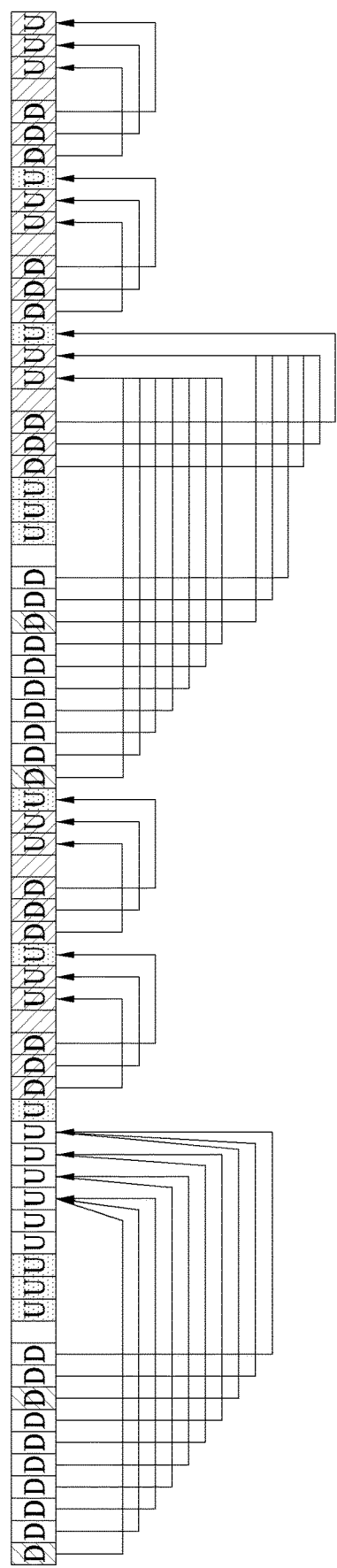
FIG. 18 shows another example of an HARQ-ACK timing for a case that a length of TTI is 2 symbols in case of introducing an additional subframe type into some uplink subframes in TDD UL/DL configuration #1 according to a method A) of a second embodiment of the present invention.

FIG. 18 shows another example of an HARQ-ACK timing for a case that a length of TTI is 2 symbols in case of introducing an additional subframe type into some uplink subframes in TDD UL/DL configuration #1 according to a method A) of a second embodiment of the present invention. Particularly, in FIG. 18, an additional subframe type is assumed as applied to a subframe #0, a subframe #2, a subframe #5 and the like.

Method B)

If an HARQ-ACK timing is reutilized maximally before additional subframe type application, it may be inefficient according to a specific TTI length in aspect of latency reduction. Hence, it may be able to consider resetting an HARQ-ACK timing depending on a presence or non-presence of an additional subframe type introduction and position. Moreover, in this case, the HARQ-ACK timing may be reset in order to reduce the HARQ-ACK timing to the maximum by considering HARQ-ACK distribution.

In some implementations, since a PDCCH region can be assumed at a position corresponding to a DL subframe before applying an additional subframe type, a DL sTTI overlapping with the corresponding PDCCH region entirely or in part may correspond to a same UL sTTI by configuring a same bundling window as another DL sTTI. A detailed timing setting may utilize the scheme mentioned in the first method of the first embodiment.

Figure 19:
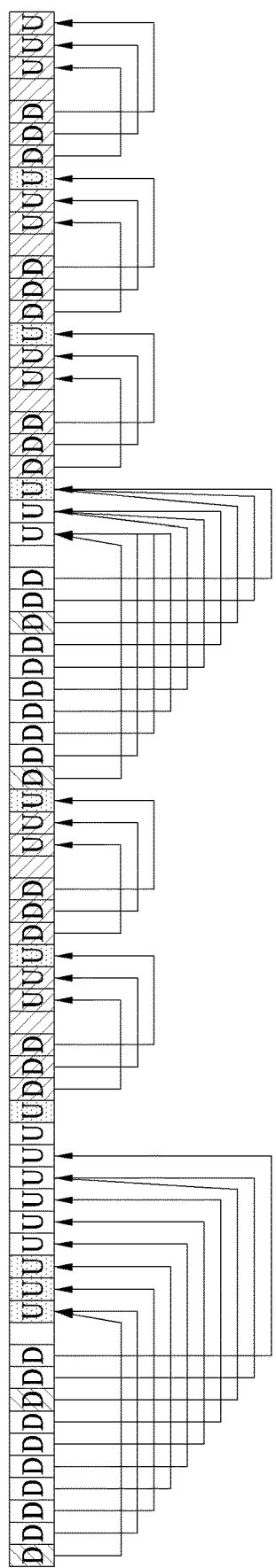
FIG. 19 shows one example of an HARQ-ACK timing for a case that a length of TTI is 2 symbols in case of introducing an additional subframe type into the rest of subframes except some uplink subframes in TDD UL/DL configuration #1 according to a method B) of a second embodiment of the present invention.

FIG. 19 shows one example of an HARQ-ACK timing for a case that a length of TTI is 2 symbols in case of introducing an additional subframe type into the rest of subframes except some uplink subframes in TDD UL/DL configuration #1 according to a method B) of a second embodiment of the present invention. Particularly, in FIG. 19, some UL subframes to which an additional subframe type is not applied are assumed as including a subframe #0, a subframe #2, a subframe #5 and the like.

Alternatively, an X TTI value is set as 1.5 TTI_DL+1.0 TTI_UL+TA+Margin and the like by considering a decoding time and an encoding time for each a DL TTI length and a UL TTI length and/or a TA, and a timing is then set up according to the corresponding value. For example, all DL sTTIs within 10 or 5 ms among DL sTTIs ahead of the X TTI from the earliest UL sTTI in a frame are configured as a same bundling window and made to correspond to a corresponding UL sTTI. A next UL sTTI may be made to correspond by configuring all DL sTTIs ahead of X TTI from the corresponding UL sTTI as a same bundling window from a next DL sTTI. In this case, a payload size supported by sPUCCH for HARQ-ACK transmission needs to be increased.

In case that an HARQ-ACK timing is dynamically determined (e.g., in case that DCI for scheduling sPDSCH indicates an HARQ-ACK timing), sTTI may be selected based on the HARQ-ACK timing or designated in direct. If sTTI is indicated in direct, the corresponding sTTI may be considered/assumed as an sTTI in which sPDSCH and/or sPDCCH is not transmitted, depending on whether sTTI overlaps with a PDCCH region and/or an occupied rate or an overlapping shape of the PDCCH region over total REs (whether the PDCCH region is included from the beginning or a middle symbol, etc.) if the sTTI overlaps with the PDCCH region.

Third Embodiment—Timing Setting if a Length of DL sTTI Differs from that of UL sTTI A length of DL sTTI may be set different from that of UL sTTI. For each case, an HARQ-ACK timing can be changed. According to a third embodiment of the present invention, a method/procedure for changing an HARQ-ACK timing into a suitable timing according to a combination of DL sTTI and UL sTTI is proposed. For clarity, although the following description is made with reference to a timing from DL to UL, a reverse case (a Tx timing from UL to DL) is extensible/applicable from the present invention.

Basically, when decoding and encoding are compared with each other, since a processing time for the decoding is far bigger, an HARQ-ACK timing for DL sTTI that can correspond to the decoding is preferably utilized as a basic timing.

If DL sTTI is bigger than UL sTTI, it may be made to correspond to some in a UL sTTI bundle corresponding to the DL sTTI (UL TTI length reference, hereinafter sTTI_UL) at an HARQ-ACK timing of a DL TTI length (hereinafter sTTI_DL) reference. Typically, the earliest UL sTTI completely overlapping with an HARQ-ACK timing of an sTTI_DL reference among a plurality of UL sTTIs may correspond to DL sTTI.

For example, when a DL TTI length and a UL TTI length are 7 symbols and 2 symbols, respectively, UL sTTI corresponding to sTTI_DL #0 in FIG. 7 corresponds to sTTI_DL #5 with reference to a DL TTI length. In this case, since sTTI_DL #5 corresponds to sTTI_UL #17, sTTI_UL #18, sTTI_UL #19 and sTTI_UL #20 (yet, sTTI_UL #17 overlaps in part only) with reference to UL TTI length, sTTI_UL #18 may correspond to sTTI_DL #0.

On the contrary, if DL sTTI is smaller than UL sTTI, in an HARQ-ACK timing of a DL TTI length reference again, UL sTTI including UL sTTI of a DL TTI length reference corresponding to the DL sTTI (i.e., a start point matching) or an earlies UL TTI length reference may be set as a timing.

For example, when a DL TTI length and a UL TTI length are 2 symbols and 7 symbols, respectively, UL sTTI corresponding to sTTI_DL #21 is sTTI_DL #25 in FIG. 17. With reference to 7 symbols, sTTI_UL #7 overlaps with sTTI_DL #25. In this case, UL sTTI corresponding to sTTI_DL #21 may include sTTI_UL #7 or sTTI_UL #13 that is an earlies UL sTTI since sTTI_DL #25.

Alternatively, an X TTI value is set as 1.5 TTI_DL+1.0 TTI_UL+TA+Margin and the like by considering a decoding time and an encoding time for each a DL TTI length and a UL TTI length and/or a TA, and a timing is then set up according to the corresponding value. For example, all DL sTTIs within 10 or 5 ms among DL sTTIs ahead of the X TTI from the earliest UL sTTI in a frame are configured as a same bundling window and made to correspond to a corresponding UL sTTI. A next UL sTTI may be made to correspond by configuring all DL sTTIs ahead of X TTI from the corresponding UL sTTI as a same bundling window from a next DL sTTI. In this case, a payload size supported by sPUCCH for HARQ-ACK transmission needs to be increased.

Fourth Embodiment—Additional Subframe Type Configuration

According to a fourth embodiment of the present invention, for clarity of description, considered is a configuring method including disposing DL symbol(s), a GP and UL symbol(s) in sequence. Such a method is exemplary. And, it is able to consider a configuring method including disposing a DL part, a GP, a UL part and a DL part again in sequence, a configuring method including disposing a DL part, a GP, a UL part, a DL part, a GP and a UL part in sequence, and the like. Moreover, it is also able to consider a configuring method including disposing a UL part and a DL part in sequence or a configuring method including disposing a UL part, a DL part, a GP and a UL part again in sequence.

In the next generation wireless communication system, an additional subframe type may be applied to a DL subframe and/or a UL subframe and/or a special subframe and/or an MBSFN subframe. A transmittable channel and RS may vary in each case. Hence, it is able to consider that an RE mapping varies as well.

Regarding whether a CRS for a DL part is included in an additional subframe type, (1) CRS transmission for a corresponding region is always performed or (2) a presence or non-presence of CRS transmission is configured different depending on a subframe kind to which the additional subframe type is applied. Detailed examples of the scheme (2) are described as follows.

First Proposal

If an additional subframe type applied subframe is a UL subframe, CRS is not transmitted for a DL part in the additional subframe type. If an additional subframe type applied subframe is a DL or MBSFN subframe, CRS is transmitted in a DL part. Typically, in case of an MBSFN subframe, CRS may be transmitted for some symbols (e.g., within first two symbols) only. If an additional subframe type applied subframe is a special subframe, CRS is transmitted in a DL part as well. More typically, if the number of symbols of DwPTS configuring a special subframe is smaller than the number of DL symbols configuring an additional subframe type, CRS may be transmitted for a DL part within the DwPTS symbols only.

Second Proposal

CRS is not transmitted for a DL part within an additional subframe type. Typically, if an additional subframe type applied subframe is a DL subframe, an MBSFN subframe or a special subframe, CRS may be transmitted for some symbols (e.g., within first two symbols) only.

Third Proposal

If an additional subframe type applied subframe is a DL or MBSFN subframe, CRS is transmitted for a DL part within the additional subframe type. Typically, for a case of an MBSFN subframe and/or a DL subframe, CRS may be transmitted for some symbols (e.g., first two symbols) only. For a case that an additional subframe type applied subframe is a special subframe, CRS is transmitted in a DL part.

More typically, if the number of symbols of DwPTS configuring a special subframe is smaller than the number of DL symbols configuring an additional subframe type, CRS may be transmitted for a DL part within the DwPTS symbols only. If an additional subframe type applied subframe is a UL subframe, CRS may be transmitted for a DL part for all or some of UL subframes. For example, a UE capable of receiving additional subframe type information may utilize an additional CRS transmitted in a corresponding subframe.

The kind (e.g., DL subframe, UL subframe, and MBSFN subframe) of the additional subframe type applied subframe may include a kind of a subframe configured on SIB or indicate a kind of a subframe configured by a higher layer. CRS transmitted in a DL part for all or some of additional subframe types may be used for a timing tracking or utilized for RRM/RLM and the like. For the RRM/RLM, a signaling for indicating a CRS transmitted part may be added or modified and include an additional subframe type applied subframe.

Meanwhile, a presence or non-presence of PDCCH (e.g., PDCCH for normal TTI (14 symbol TTI)) transmission for a DL part in an additional subframe type may: (1) not support PDCCH transmission for a corresponding region all the time; or (2) configure a presence or non-presence of PDCCH transmission possibility differently depending on an additional subframe type applied subframe kind. Typically, according to the first to third proposals, PDCCH transmission may be supported depending on a CRS-transmitted additional subframe type.

More typically, if a CRS transmitted region is restricted to some symbols (e.g., within first two symbols), PDCCH may not be transmitted. In this case, a UE may not perform a PDCCH monitoring according to the corresponding information (e.g., information configured in advance or by a higher layer). If a PDCCH Tx resource corresponds to a case that an additional subframe type is applied to a UL subframe, a UE transmitting the corresponding PDCCH may be restricted to a UE capable of an latency reduction operation at least (e.g., a UE capable of transmitting/receiving sPDCCH/sPDSCH/sPUCCH/sPUSCH in case of being operational with a shortened TTI, hereinafter named a TTI-capable UE). The case of PDCCH may be limited to a case that a DL part within an additional subframe type is disposed at a fore part by including a first symbol.

Moreover, in case that CRS and PDCCH are not transmitted in a DL part within an additional subframe type, it is able to consider emptying an RE corresponding to a CRS position. In this case, sPDCCH and/or sPDSCH for a shortened TTI may be mapped for the remaining region except the CRS position. According to the advantage of such a method, a scheme of mapping to sPDCCH/sPDSCH can be identically configured for a DL subframe to which an additional subframe type is not applied and a DL part to which an additional subframe type is applied.

A presence or non-presence of possibility of SRS/PRACH transmission for a UL part in an additional subframe type may: (1) not support SRS/PRACH transmission for the corresponding region all the time; or (2) configure a presence of non-presence of transmission possibility differently depending on an additional subframe type applied subframe kind and a channel kind (e.g., SRS/PRACH).

SRS and/or PRACH transmission is not supported for a case that an additional subframe type applied subframe is a DL subframe and/or an MBSFN subframe. For a case that an additional subframe type is a special subframe and/or a UL subframe, SRS and/or PRACH may be transmittable. More typically, a case of PRACH may be restricted to a case that an additional subframe type is applied to a special subframe.

For a case that an additional subframe type is a special subframe and/or a UL subframe, SRS and/or PRACH may be transmittable. More typically, a case of PRACH may be restricted to a case that an additional subframe type is applied to a special subframe. For a case that and additional subframe type applied subframe is a DL subframe and/or MBSFN subframe, SRS and/or PRACH may support transmission for all or some subframes. In this case, an SRS subframe and/or a PRACH resource may introduce additional signaling or modify an existing configuration scheme so as to include an additional subframe type applied subframe.

In the above description, a presence or non-presence of possibility of SRS and PRACH transmission may be limited to a case of each of a cell-specific/UE-specific SRS subframe and a PRACH resource. Moreover, in case of PRACH, it may be limited to a case that a PRACH preamble format is set to #4. The kind of the additional subframe type applied subframe (e.g., DL subframe, UL subframe, MBSFN subframe) may be the kind of a subframe configured on SIB or indicate the kind of a subframe configured by a higher layer. A UL part within an additional subframe type may be limited to a case of being disposed on a last part by including a last symbol in a subframe.

If an additional subframe type is applied to a special subframe and an SRS and/or PRACH resource is configured through UpPTS of the special subframe for a legacy UE, it may be able to consider that the corresponding resource is not utilized for shortened TTI channel transmission so as to minimize influence on SRA and/or PRACH that can be transmitted by the legacy UE. For example, in case that sPUCCH or sPUSCH transmission overlaps with a cell-specific SRS BW in a cell-specific SRS subframe, the corresponding channel is dropped all or punctured or rate-matched to empty the overlapping region. More typically, in case of sPUCCH, in a cell-specific SRS subframe irrespective of a cell-specific BW, the corresponding channel may be dropped all the time or according to a configuration through a higher layer signaling of the third or punctured/rate-matched to empty an overlapping region.

For example of collision with PRACH, sPUCCH/sPUSCH may not perform transmission as to symbols (e.g., last two or three symbols in some special subframe configured by a higher layer) overlapping with a PRACH time resource. In this case, although sPUCCH/sPUSCH can be assigned so as to prevent the RPACH time resource from overlapping on a frequency axis, it may not be used. Alternatively, if sPUCCH/sPUSCH overlaps in part in consideration of time and frequency resources of PRACH, it is able to consider not transmitting sPUCCH/sPUSCH. More typically, regarding sPUCCH or sPUSCH, it may be able to avoid collision by puncturing or rate-matching a part overlapping with a PRACH resource.

FIG. 20 is a block diagram of a communication apparatus according to one embodiment of the present invention.

Referring to FIG. 20, a communication apparatus 2000 includes a processor 2010, a memory 2020, a Radio Frequency (RF) module 2030, a display module 2040 and a user interface module 2050.

The communication apparatus 2000 is shown for convenience of description and some modules thereof may be omitted. In addition, the communication apparatus 2000 may further include necessary modules. In addition, some modules of the communication apparatus 2000 may be subdivided. The processor 2010 is configured to perform an operation of the embodiment of the present invention described with reference to the drawings. For a detailed description of the operation of the processor 2010, reference may be made to the description associated with FIGS. 1 to 19.

The memory 2020 is connected to the processor 2010 so as to store an operating system, an application, program code, data and the like. The RF module 2030 is connected to the processor 2010 so as to perform a function for converting a baseband signal into a radio signal or converting a radio signal into a baseband signal. The RF module 2030 performs analog conversion, amplification, filtering and frequency up-conversion or inverse processes thereof. The display module 2040 is connected to the processor 2010 so as to display a variety of information. As the display module 2040, although not limited thereto, a well-known device such as a Liquid Crystal Display (LCD), a Light Emitting Diode (LED), or an Organic Light Emitting Diode (OLED) may be used. The user interface module 2050 is connected to the processor 2010 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the aforementioned method of performing HARQ for s shortened TTI support in a wireless communication system and apparatus therefor are described by focusing on examples applying to the 3GPP LTE system, they are applicable to various wireless communication systems as well as to the 3GPP LTE system.

What is claimed is:

1. A method of transmitting an uplink signal to a base station (BS) by a user equipment (UE) in a wireless communication system, the method comprising:
   receiving a downlink signal from the BS on a downlink resource based on a first type of transmission time interval (TTI); and
   transmitting the uplink signal related to the downlink signal to the BS on an uplink resource based on a second type of TTI,
   wherein the first type of TTI is shorter than the second type of TTI,
   wherein the uplink resource, which is based on the second type of TTI, is determined based on the downlink resource, which is based on the first type of TTI,
   wherein a single uplink resource based on the second type of TTI corresponds to a plurality of downlink resources based on the first type of TTI, and
   wherein a length of the second type of TTI is greater than twice a length of the first type of TTI.

2. The method of claim 1, wherein the uplink signal comprises an uplink data signal, and
   wherein the downlink signal comprises a downlink control signal scheduling the uplink signal.

3. The method of claim 1, wherein the downlink signal comprises a downlink data signal, and
   wherein the uplink signal comprises an uplink control signal as a response to the downlink data signal.

4. The method of claim 1, wherein a starting boundary of the uplink resource, which is based on the second type of TTI, is aligned with a starting boundary of an uplink resource based on the first type of TTI.

5. The method of claim 4, wherein the uplink resource based on the first type of TTI comprises an uplink resource located after a lapse of a decoding time of the downlink signal from the downlink resource, which is based on the first type of TTI.

6. The method of claim 1, wherein at least one of the first type of TTI and the second type of TTI comprises a short TTI.

7. The method of claim 1, wherein a resource number of the uplink resource is determined based on a resource number of the downlink resource.

8. A user equipment (UE) configured to operate in a wireless communication system, the UE comprising:
a transceiver; and
at least one processor coupled to the transceiver and configured to:
receive a downlink signal from a base station (BS) on a downlink resource based on a first type of transmission time interval (TTI); and
transmit an uplink signal related to the downlink signal to the BS on an uplink resource based on a second type of TTI,
wherein the first type of TTI is shorter than the second type of TTI, and
wherein the uplink resource, which is based on the second type of TTI is determined based on the downlink resource, which is based on the first type of TTI,
wherein a single uplink resource based on the second type of TTI corresponds to a plurality of downlink resources based on the first type of TTI, and
wherein a length of the second type of TTI is greater than a twice of a length of the first type of TTI.

9. The UE of claim 8, wherein the uplink signal comprises an uplink data signal, and
wherein the downlink signal is a downlink control signal scheduling the uplink signal.

10. The UE of claim 8, wherein the downlink signal comprises a downlink data signal, and
wherein the uplink signal comprises an uplink control signal as a response to the downlink data signal.

11. The UE of claim 8, wherein a starting boundary of the uplink resource, which is based on the second type of TTI, is aligned with a starting boundary of an uplink resource based on the first type of TTI.

12. The UE of claim 11, wherein the uplink resource based on the first type of TTI comprises an uplink resource located after a lapse of a decoding time of the downlink signal from the downlink resource, which is based on the first type of TTI.

\* \* \* \* \*